United States Patent
Freund et al.

(10) Patent No.: US 10,387,916 B1
(45) Date of Patent: Aug. 20, 2019

(54) METHOD FOR FACTORING IN THE RELATIONSHIP BETWEEN SIZE OF THE ADVERTISER LANDING PAGE, THE SIZE OF THE AD CREATIVE, AND A GIVEN USER'S INTERNET BANDWIDTH INTO AN AD AUCTION

(71) Applicant: Google LLC, Mountain View, CA (US)

(72) Inventors: Martin Brandt Freund, Mountain View, CA (US); Yuanying Xie, Mountain View, CA (US)

(73) Assignee: Google LLC, Mountain View, CA (US)

(*) Notice: Subject to any disclaimer, the term of this patent is extended or adjusted under 35 U.S.C. 154(b) by 1125 days.

(21) Appl. No.: 14/059,745

(22) Filed: Oct. 22, 2013

(51) Int. Cl.
 *G06Q 30/00* (2012.01)
 *G06Q 30/02* (2012.01)

(52) U.S. Cl.
 CPC .............. *G06Q 30/0263* (2013.01)

(58) Field of Classification Search
 CPC ................................. G06Q 30/02
 USPC ............................ 705/14.73, 14.4
 See application file for complete search history.

(56) References Cited

U.S. PATENT DOCUMENTS

| | | |
|---|---|---|
| 7,493,553 B1 | 2/2009 | Vora et al. |
| 7,827,060 B2 | 11/2010 | Wright et al. |
| 2006/0149624 A1 | 7/2006 | Baluja et al. |
| 2012/0253899 A1* | 10/2012 | Qin ............... G06Q 30/0241 705/14.4 |
| 2013/0238751 A1* | 9/2013 | Raleigh ............. H04L 67/20 709/217 |

* cited by examiner

*Primary Examiner* — Sun M Li
(74) *Attorney, Agent, or Firm* — Foley & Lardner LLP

(57) ABSTRACT

A method for providing a content item for display based on a relationship between a loading speed of a web page, a bandwidth of a channel between a content source and a device, and a size of the content item including receiving, from a server, a request to provide a content item for display at a device. The method further includes calculating, by one or more processors, a quality score for the content item based on a loading speed of a web page, a bandwidth of a channel between a content source and the device, and a size of the content item. The method also includes, based on the quality score, selecting the content item for presentation on the device.

16 Claims, 3 Drawing Sheets

METHOD FOR FACTORING IN THE RELATIONSHIP BETWEEN SIZE OF THE ADVERTISER LANDING PAGE, THE SIZE OF THE AD CREATIVE, AND A GIVEN USER'S INTERNET BANDWIDTH INTO AN AD AUCTION

BACKGROUND

A content item may be selected to be displayed to a user based on its success in a content item auction. The content item auction uses several measurements, such as quality score and bid amount to determine which content item to display. The methods and systems described herein ensure that a relevant content item is provided to the user.

SUMMARY

One implementation disclosed herein is a method. The method includes receiving, from a server, a request to provide a content item for display at a device. The method further includes calculating, by one or more processors, a quality score for the content item based on a loading speed of a web page, a bandwidth of a channel between a content source and the device, and a size of the content item. The method also includes, based on the quality score, selecting the content item for presentation on the device.

Another implementation disclosed herein is a system including one or more processors configured to receive a request to provide a content item for display at a device. The one or more processors may also be configured to calculate a quality score for the content item based on a loading speed of a web page, a bandwidth of a channel between a content source and the device, and a size of the content item. The one or more processors may further be configured to, based on the quality score, select the content item for presentation on the device.

In yet a further implementation disclosed herein is a computer-readable storage medium having machine instructions stored therein, the instructions being executable by a processor to cause the processor to perform operations. The operations may include receiving a request to provide a content item for display at a device. The operations may also include calculating a quality score for the content item based on a loading speed of a web page, a bandwidth of a channel between a content source and the device, and a size of the content item. The operations may further include, based on the quality score, selecting the content item for presentation on the device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

The quality score measures a variety of factors to determine the ranking and pricing of a content item (e.g., an advertisement). Therefore, the factors are used to provide relevant content items to a user.

These factors may include the device of the user, the Internet capabilities of the device, the loading speed of a content provider's webpage (e.g., an advertiser's landing page), etc. The relationship between these factors may also be used to determine the quality score. For example, the bandwidth, connection and so forth of a user's device may change the loading speed of the web page, which can alter the experience the user has with the web page. For example, if a web page includes high quality images or flash-based images, then, the web page may slowly load on the user's device if it is a mobile phone. In this case, the quality score may be low due to the user's device. Therefore, the relationship between the bandwidth and the loading speed of the web page should be determined and provided as a factor for the quality score.

Figure 1:
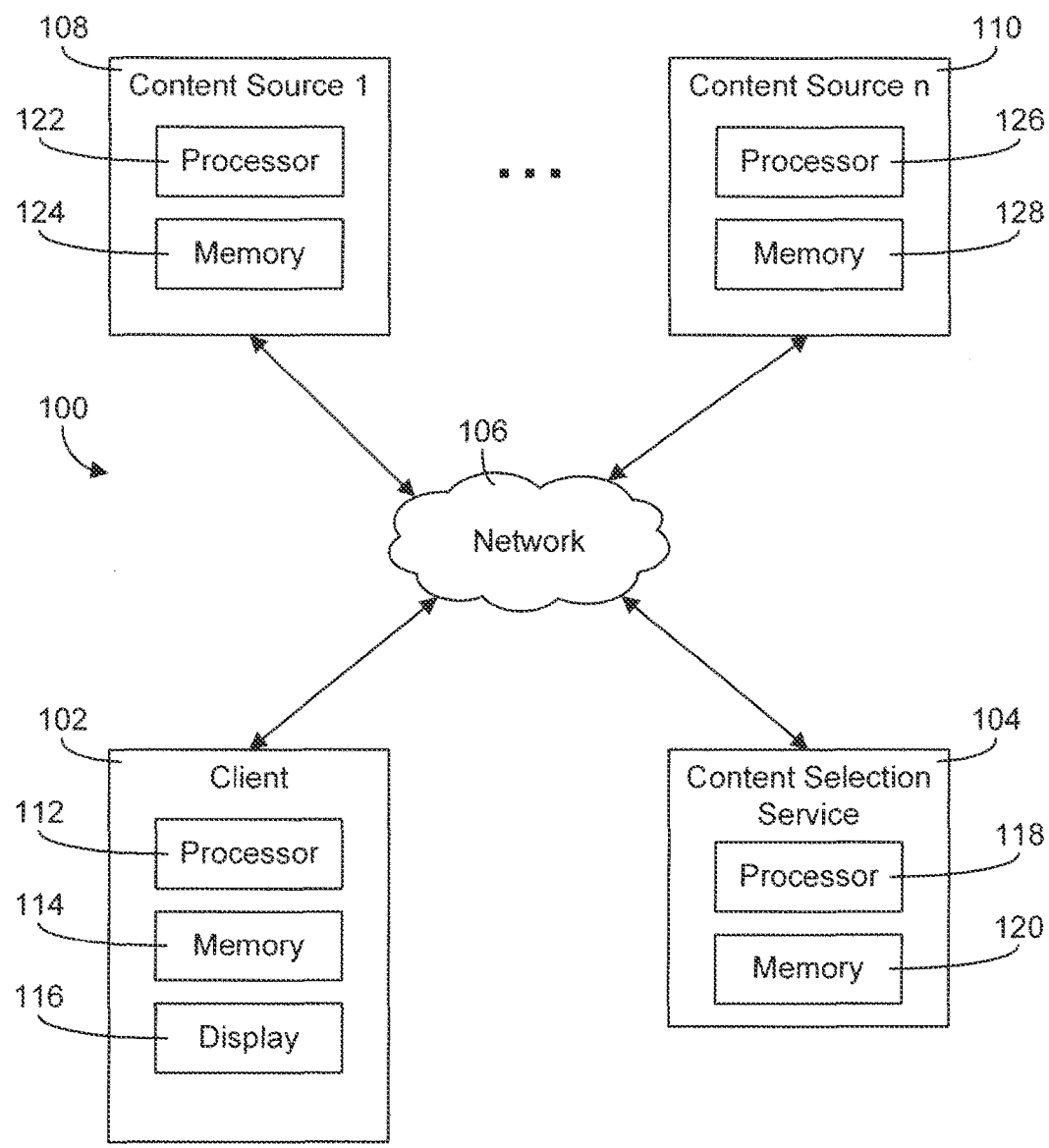
FIG. 1 is a block diagram of a computer system in which third-party content is selected for presentation with first-party content, according to one implementation.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve content from other devices over network 106. For example, client device 102 may communicate with any number of content sources 108, 110 (e.g., a first content source through nth content source). Content sources 108, 110 may provide webpage data and/or other content, such as images, video, and audio, to client device 102. Computer system 100 may also include a content selection service 104 configured to select third-party content to be provided to client device 102. For example, content source 108 may provide a first-party webpage to client device 102 that includes additional third-party content selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT6 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as being a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client device 102 may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, the processing circuit of content source 108 may include instructions such as web server software, FTP serving software, and other types of software that cause content source 108 to provide content via network 106.

According to various implementations, any of content sources 108, 110 may provide first-party webpage data to client device 102 that includes one or more content tags. In general, a content tag refers to any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. For example, content source 108 may serve first-party webpage data to client device 102 that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108, 110.

Content selection service 104 may also be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processing circuit including a processor 118 and a memory 120 that stores program instructions executable by processor 118. In cases in which content selection service 104 is a combination of computing devices, processor 118 may represent the collective processors of the devices and memory 120 may represent the collective memories of the devices.

Content selection service 104 may be configured to select third-party content for client device 102 (i.e., content selection service 104 may provide a third-party content selection service). In one implementation, the selected third-party content may be provided by content selection service 104 to client device 102 via network 106. For example, content source 110 may upload the third-party content to content selection service 104. Content selection service 104 may then provide the third-party content to client device 102 to be presented in conjunction with first-party content provided by any of content sources 108, 110. In other implementations, content selection service 104 may provide an instruction to client device 102 that causes client device 102 to retrieve the selected third-party content (e.g., from memory 114 of client device 102, from content source 110, etc.). For example, content selection service 104 may select third-party content to be provided as part of a first-party webpage being visited by client device 102 or within a first-party application being executed by client device 102 (e.g., within a game, messenger application, etc.).

In some implementations, content selection service 104 may be configured to select content based on a device identifier associated with client device 102. In general, a device identifier refers to any form of data that may be used to represent a device or software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, user profile data, or network addresses. For example, a cookie set on client device 102 may be used to identify client device 102 to content selection service 104.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by content selection service 104 and presented to the user. Certain data, such as a device identifier, may be anonymized in one or more ways before it is stored or used, so that personally identifiable information is removed when generating parameters (e.g., demographic parameters) used by content selection service 104 to select third-party content. For example, a device identifier for client device 102 may be anonymized so that no personally identifiable information about its corresponding user can be determined by content selection service 104 from it. In another example, a user's geographic location may be generalized where location information is obtained (such as to a city, ZIP code, or state level), so that a precise location of the user cannot be determined. Thus, the user of client device 102 may have control over how information is collected about him or her and used by content selection service 104.

If the user of client device 102 has elected to allow content selection service 104 to use information regarding him or her, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select third-party content to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select third-party content to be provided as part of a first-party webpage or in conjunction with search results from one of content sources 108, 110.

Content selection service 104 may analyze the history data associated with a device identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of /Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the webpage being loaded, the referring webpage, etc.). For example, content selection service 104 may receive and store history data regarding whether or not third-party content provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108, 110. For example, content source 108 may store history data regarding web transactions with client device 102 and provide the history data to content selection service 104.

Content selection service 104 may apply one or more weightings to an interest or product category, to determine whether the category is to be associated with a device identifier. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

Content selection service 104 may be configured to conduct a content auction among third-party content providers to determine which third-party content is to be provided to client device 102. For example, content selection service 104 may conduct a real-time content auction in response to client device 102 requesting first-party content from one of content sources 108, 110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client device 102. In other words, the bid amount may be on a cost per impression or cost per thousand impressions (CPM) basis. In further cases, a bid amount may correspond to a specified action being performed in response to the third-party content being presented at a client device. For example, a bid amount may be a monetary amount that the third-party content provider is willing to pay, should their content be clicked on at the client device, thereby redirecting the client device to the provider's webpage. In other words, a bid amount may be a cost per click (CPC) bid amount. In another example, the bid amount may correspond to an action being performed on the third-party provider's website, such as the user of client device 102 making a purchase. Such bids are typically referred to as being on a cost per acquisition (CPA) or cost per conversion basis.

A campaign or other grouping of third-party content created via content selection service 104 may also include selection parameters that control when a bid is placed on behalf of a third-party content provider in a content auction. Any specified content selection parameters may be stored as part of the account of the provider. If the third-party content is to be presented in conjunction with search results from a search engine, for example, the content selection parameters may include one or more sets of search keywords. For example, the third-party content provider may only participate in content auctions in which a search query for "golf resorts in California" is sent to a search engine. Other content selection parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content (e.g., a zip code, city, state, country, etc.), a geographic location specified as part of a search query, or a device type (e.g., mobile devices, desktop devices, tablet devices, etc.). In some cases, a selection parameter may designate a specific webpage, website, or group of websites with which the third-party content is to be presented. For example, an advertiser selling golf equipment may specify that they wish to place an advertisement on the sports page of an particular online newspaper.

Content selection service 104 may be configured to apportion a percentage of earnings from a third-party content provider to the provider of the first-party content with which the third-party content is presented. For example, content selection service 104 may apportion 40% of the revenues received from a third-party content provider to the operator of content source 108 whenever the third-party content is selected for presentation on a website from content source 108. Thus, a first-party content provider may receive revenues in exchange for allowing third-party content to be provided with the provider's content. Revenues apportioned to a first-party content provider by content selection service 104 may be based on the number of times third-party content was provided to devices (e.g., based on a number of impressions), based on whether or not a user clicked on the third-party content (e.g., a click count), or based on any other performance metric.

An account of a first-party content provider in content selection service 104 may also include any number of content selection parameters that control which third-party content is eligible for presentation with the content from the first-party provider. For example, a first-party content provider may specify to content selection service 104 the topics of third-party content eligible for selection for the provider's content. Another content selection parameter may control whether third-party content to appear with the provider's content may be selected based on an interest category (e.g., the third-party content may be unrelated to the topic of the first-party content, but determined to be of relevance to a particular user). Other content selection parameters may allow or prevent content from specific third-party content providers, specific web addresses, specific websites, or the like.

Content selection service 104 may be configured to determine performance metrics for a content provider. In one implementation, performance metrics may correspond to revenues earned by a first-party content provider. In another implementation, performance metrics may correspond to how users responded to third-party content selected by content selection service 104. For example, content selection service 104 may determine an impression count (e.g., how many times third-party content was presented), a click count (e.g., how many times the presented third-party content was clicked), a conversion count (e.g., how many times the clicked third-party content led to a sale or other desired online action), a click through rate (CTR), or a conversion rate (CVR). In some implementations, performance metrics determined by content selection service 104 may be subdivided according to any number of different traffic characteristics. Potential traffic characteristics for the performance metrics may include, but are not limited to, the geographic locations of devices accessing the content, the types of devices accessing the content (e.g., mobile devices, tablet devices, desktop devices, etc.), the particular configuration of the devices accessing the content (e.g., operating systems, hardware settings, etc.), interest categories used to select the third-party content, the times in which the content is accessed (e.g., broken down by minute, hour, day, week, month, etc.), predicted information about the users accessing the content, combinations thereof, or the like.

In some implementations, content selection service 104 may be configured to monitor the performance metrics of a content provider across any number of different traffic characteristics or other classifications used to subdivide the performance metrics. For example, content selection service 104 may monitor the revenues earned by a first-party content provider broken down by the different device types that access content from the provider (e.g., revenues for mobile devices, revenues for desktop devices, etc.). In one implementation, content selection service 104 may detect a change in the relationships between the subdivided performance metrics. For example, content selection service 104 may determine that the revenues of the provider attributable to devices located in the United States have overtaken the revenues of the provider attributable to devices located in India. In some implementations, content selection service 104 may predict whether a change in performance metrics across one or more traffic characteristics will continue. For example, content selection service 104 may determine whether a shift in the provider's revenues is likely to continue or is a temporary shift. Content selection service 104 may also generate and provide a notification to a content provider if a shift is detected in the performance metrics of the provider. For example, content selection service 104 may provide a notification to a device of a content provider indicating that mobile revenues have surpassed desktop revenues and that the trend is predicted to continue. Such a notification may be used by the content provider to tailor the provider's content accordingly or on a purely informational basis. For example, a first-party content provider may optimize his or her website for mobile devices if the provider's revenues have shifted towards an emphasis on mobile devices.

In one implementation, content selection service 104 may generate a notification based on an action or event associated with a content provider. An action or event triggering the monitoring of performance metrics by content selection service 104 may include changes made to the provider's account (e.g., by changing content selection parameters in the provider's account), changes made to the provider's content (e.g., by redesigning the provider's website), or the like. Content selection service 104 may monitor any performance metric changes subsequent to the action or event in response to a request from the provider to do so (e.g., the provider elects to receive notifications) or automatically in response to the action or event. If a change in the provider's performance metrics is detected and attributable to the triggering action or event, content selection service 104 may generate and provide a notification to the provider regarding the performance change. For example, content selection service 104 may generate a notification for a first-party content provider indicating that the provider's revenues have dropped by a certain amount or percentage as a result of the provider blocking certain types of third-party content from appearing on the provider's website.

Figure 2:
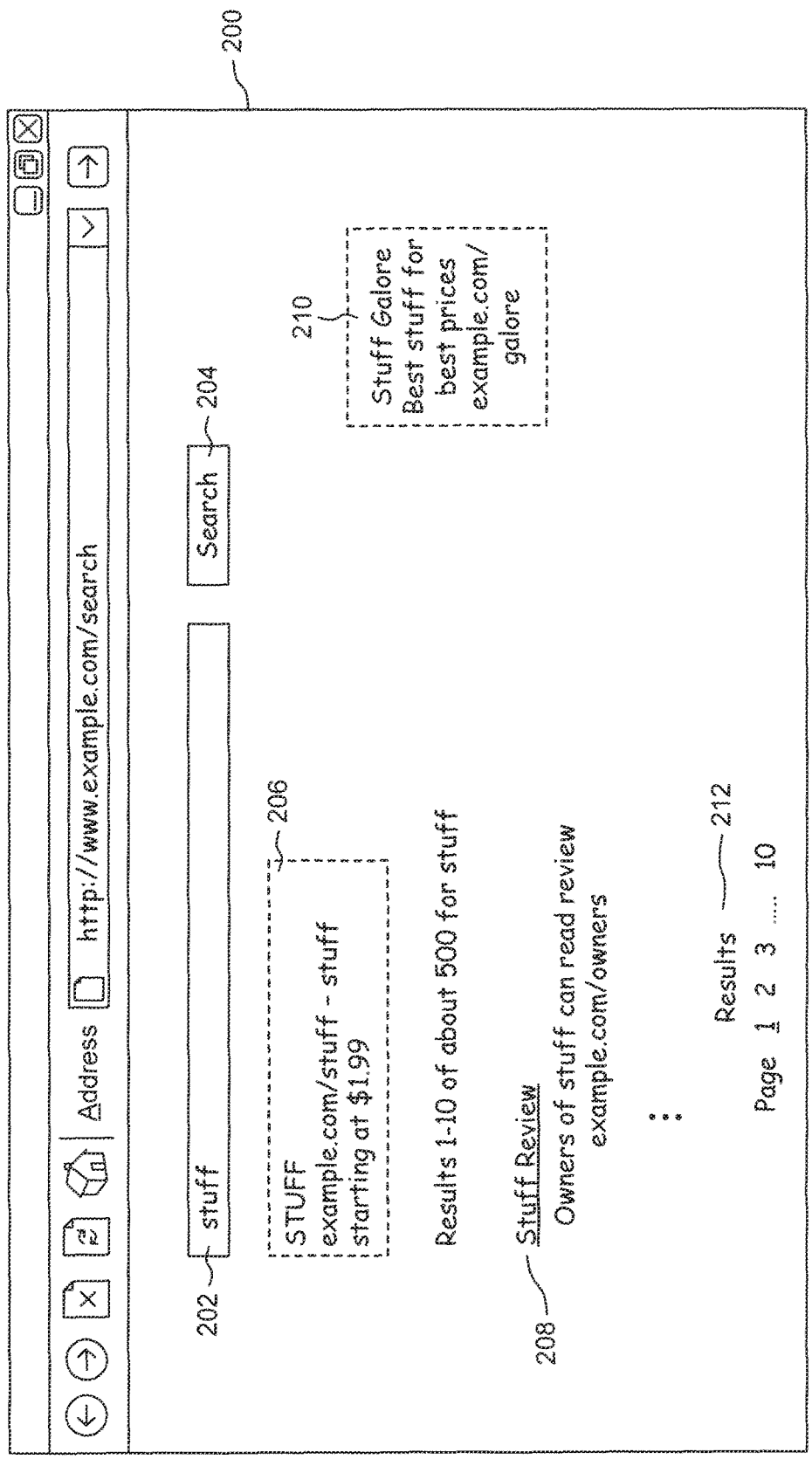
FIG. 2 is an example web page of the display of one or more content items with search results, according to one implementation.

FIG. 2 is an example web page of the display of one or more content items with search results, according to one implementation. Web page 200 may include one or more content items along with content. In FIG. 2, the content includes search results.

As shown in FIG. 2, web page 200 may include a query input field 204 and a search button 204. The entry of a query into field 204 along with a selection of button 204 causes a query to be submitted to a search engine/content provider. The content provider or search engine provides web page 200. As shown in FIG. 2, web page 200 includes search result 208.

Web page 200 also includes a page identifier 212. Page identifier 212 indicates that web page 200 include additional search results, which the user may access. The subsequent pages may include the additional search results and one or more content items.

Search result 208 may include a universal resource locator to specify the location of a corresponding resource. The corresponding resource may include a web page, a document, and so forth.

Web page 200 may also include content items 206, 210. Content items 206, 210 may be located in a number of positions on web page 200. Here, they are illustrated in the top position and side position, respectively. Additional content items may also be displayed. The search result 214 and content items 206, 210 are relevant to the query "stuff" provided in field 202. For example, search result 208 provides a webpage that provides the opportunity to purchase "stuff" for $1.99. In this example, search result 208 may be the "most relevant" result, because of its position at the top of web page 200. Content item 210 provides additional information and more opportunities to purchase "stuff."

Content items 206, 210 may be selected by content selection service 104 based on associated bid amounts. For example, a content item provider may select/bid an amount that they would be willing to pay for each impression, click, engagement, etc. of a content item, i.e., an amount each time a user clicks on the content item.

The position of content items 206, 210 may be selected by content selection service 104 based on their quality score. For example, the location at the top of web page 200, which includes content item 206, may be associated with the "most relevant" content item according to the quality score, while the location at the side of web page 200, which includes content item 210, may be associated with "less relevant" content items, according to the quality score. In some implementations, the positioning of the content items 206, 210 may be associated with the quality, as measured by the quality score, of the content items 206, 210.

Figure 3A:
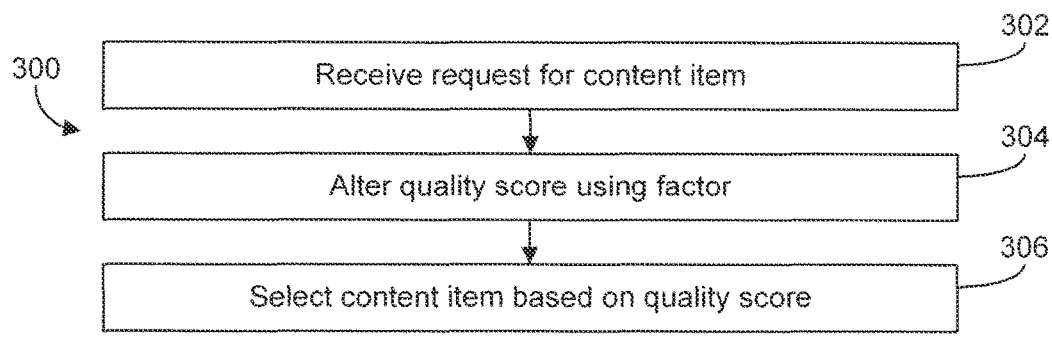
FIG. 3A is a flow chart of a process for selecting a content item based on an altered quality score, according to one implementation.

FIG. 3A is a flow chart of a process 300 for selecting a content item based on an altered quality score, according to one implementation. Process 300 may begin by a request for a content item being obtained (step 302). For example, the request for the content item may be from a client device and provided to content selection service 104. In some implementations, the request for the content item includes a factor.

The factor may be determined based on assessing positive and negative components. Such components may include the relevancy of a keyword, a content item provider's landing page, or the content item. The content provider's landing page transparency, navigability and speed are also components in the assessment of quality. For example, if the content on the content provider's landing page is duplicative or spam, then this can lead to a negative assessment of quality.

The relationship between the bandwidth, the loading speed of the web page, and the content item size, type (e.g., flash, high-definition, etc.), etc. may also be assessed for quality. For example, a user having a slow Internet connection may click on a content item that directs them to the content provider's landing web page, which includes images, videos, third-party scripts (e.g., analytics, social networking links, other content items), etc. This landing web page uses a large amount of bandwidth, therefore, the content provider may have to increase the bid amount to provide a content item. Therefore, the relationship, in this example, is a negative component. In this example, if the user had a fast Internet connection, then the relationship may have been a positive component or not had an impact on the quality score.

Other components may include, but are not limited to, a click-through rate of the content item, the size of the content item, the overall historical keyword performance, the pagerank of the content item provider's landing page, etc.

The selection of the content item may be based on the altered quality score (step 306). The altered quality score may be used to determine the rank of the content item. The content item may be placed among other content items in order of increasing to decreasing rank. The position of the content item on the web page that is displayed to a user may be determined by multiplying the maximum cost per click, cost per impression, cost per engagement, cost per conversion, etc. by the quality score.

Figure 3B:
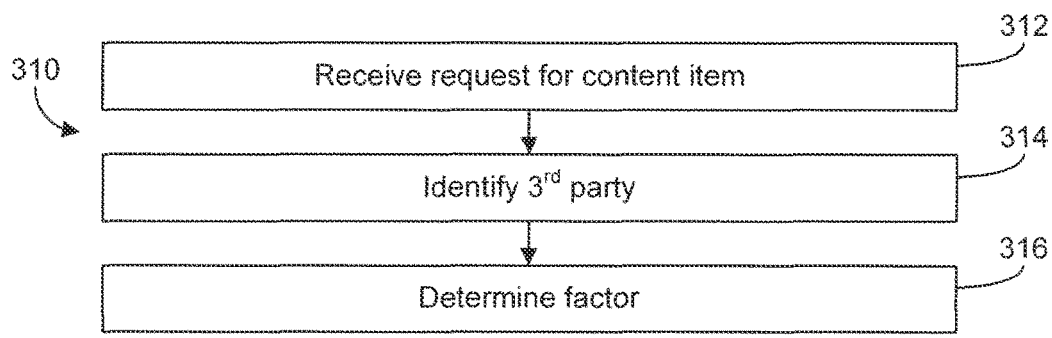
FIG. 3B is a flow chart for a process for determining a factor used to alter the quality score, according to one implementation.

FIG. 3B is a flow chart for a process 310 for determining the factor used to alter the quality score, according to one implementation. Process 300 may begin by a request for a content item being obtained (step 302). For example, the request for the content item may be from a client device and provided to content selection service 104. In some implementations, the request for the content item includes a factor.

In another example, the factor may be discounted, based on the bandwidth of the user vs. the speed of the landing page of the content item provider, i.e., how fast the landing page loads on the user's device. The landing page of the advertiser may be determined, either dynamically or historically. For example, the content selection service may receive the content item request via a third party module (at step 314). The third party module may determine the speed of the landing page at real-time when the content item request is received by the content selection service or may access a database to retrieve the speed of the landing page.

The discount may be calculated each time a content item request is received. In another implementation, the discount may be determined based on a threshold, such as comparing the landing speed of the web page to other landing page speeds by retrieving the speeds from a database, i.e., a look up table containing various multipliers. For example, if the landing speed of the web page exceeds a target speed by X, then the factor may be discounted by X. Therefore, if a bid amount specified by a content item provider is Y, then the bid amount may be discounted by X.

The factor is then determined after the discounting and/or altering (at step 316). In some implementations, the factor may be determined by assigning weights to different assessments and combining the weights to determine the factor. The assessments may be combined, weighted, etc. in any manner. The positive and negative assessments may be added together to determine the factor. Certain assessment values may be multiplied by a corresponding weight and the resulting values totaled to determine the factor. The factor is then applied to the quality score to determine the content item to serve to the user.

Figure 4:
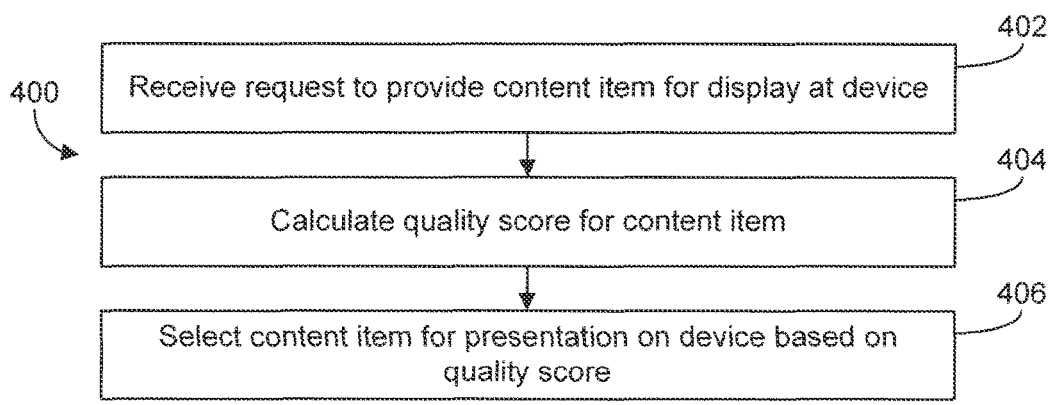
FIG. 4 is a flow diagram of a process for providing a content item to a user based on a quality score, according to one implementation.

FIG. 4 is a flow diagram of a process for providing a content item to a user based on a quality score, according to one implementation. Process 400 generally includes receiving, from a server, a request to provide a content item for display at a device (step 402), calculating, by one or more processors, a quality score for the content item based on a loading speed of a web page, a bandwidth of a channel between a content source and the device, and a size of the content item (step 404); based on the quality score, selecting the content item for presentation on the device (step 406).

Referring to FIG. 4, and in more detail, process 400 includes receiving, at a server, a request to provide a content item for display at a device (step 402). In some implementations, the request may accompany a request for web page content to be displayed with the content item at the device, such as a search query. For example, the user may provide a search query into a search engine. The web browser may provide the search query to a search engine associated with the server. The request for the content and the content item may include one or more keywords. For example, the content may be tagged with one or more keywords such that the keywords describe the content. The keyword may be used to select the content item that is responsive to the keyword or that includes the keyword.

Referring to FIG. 4, and in more detail, process 400 includes calculating, by one or more processors, a quality score for the content item based on a loading speed of a web page, a bandwidth of a channel between a content source and the device, and a size of the content item (step 404).

In some implementations, the quality score measures a quality and relevance of the content item. The quality score may measure how relevant, transparent, and navigable the web page is to the user. The web page may be the landing page that is owned by the content provider. In another implementation, the web page may be hosted by a publisher.

The quality score may also measure the relationship between the loading speed of the web page, the bandwidth of the channel between the content source and the device, and a size of the content item. The quality score may also measure other factors that affect the loading speed of the web page such as, but not limited to, bandwidth throttling, network congestion, rate limiting, etc.

The device may be any electronic device that is under the control of a user and is capable of requesting and receiving data over the network. The device may include a web browser that sends/receives the data over the network, such as requesting the content (web page) and the content item. The bandwidth of the device along with its connection speed may be determined for purposes of the quality score. The speed of the device in relation to the bandwidth necessary to present the content item may also be determined for purposes of the quality score.

The loading speed of the web page and the bandwidth of the channel between the content source and the device may be determined when the request for content and the request to provide the content item is received. For example, these factors are included in the quality score in real time, not just historical averages of the loading speed of the web page. In addition, the user's device and its connection may be detected in real time. For example, if the user's device has a fast connection, but the device is also downloading, streaming, sharing the connection, etc., the quality score may be affected.

The quality score may be provided to a content item auction. The content item auction also receives a bid amount, e.g., an amount the content provider is willing to pay for each interaction with the content item. The interaction may be a click, a conversion, an engagement, an impression, etc. The content provider may select the bid amount based on the impact of the relationship between the loading speed of the web page, the bandwidth, and the content item on the quality score.

Referring to FIG. 4, and in more detail, process 400 includes based on the quality score, selecting the content item for presentation on the device (step 406). In some implementations, the quality score may be multiplied by the bid amount (e.g., cost per click, cost per conversion, etc.) to determine the rank, price, etc. of the content item within the content item auction. Along with this determination, a keyword included in web page content (e.g., search query) may be used to select the content item that is responsive to that keyword. If more than one content item matches the keyword, then the rank/price, etc. may be used to determine which content item to present on the device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computer-implemented method to improve a quality of displaying a content item at a device, comprising:
    receiving, at a content selection server from a content source server, over a network, a request to provide a content item for display with content at a device, the content, provided by the content source server, including at least one display position for displaying the content item; and
    responsive to receiving the request from the content source server:
        determining, by the one or more processors at the content selection server, a bandwidth of a network channel between a content source and the device,
        determining, by one or more processors at the content selection server, a quality score for the content item based on a loading speed of a web page, the bandwidth of the channel between the content source and the device, one or more keywords associated with the content item, and a size of the content item,
        determining, by one or more processors at the content selection server, a bid amount for the content item,
        based on the quality score and the bid amount, selecting, by the one or more processors at the content selection server, the content item for presentation on the device, the quality score indicating faster loading speed of the web page over loading speeds of web pages associated with other content items, and
        providing, over the network, the content item for display with content at the device.

2. The method of claim 1, wherein the quality score measures a quality and relevance of the content item.

3. The method of claim 1, further comprising: providing the quality score to a content item auction.

4. The method of claim 3, wherein the quality score is multiplied by the bid amount to determine a rank of the content item for selection.

5. The method of claim 1, wherein the web page is owned by a content provider.

6. The method of claim 1, wherein the loading speed of the web page and the bandwidth of the channel between a content source and the device are determined when the request for content and the content item is received.

7. The method of claim 1, wherein calculating the quality score further comprises determining a speed of the device in relation to the bandwidth necessary to present the content item.

8. The method of claim 1, wherein presentation of the content item includes displaying content comprising a content provider's web page.

9. A system to improve a quality of displaying a content item at a device comprising of one or more processors configured to:
    receive, at a content selection server from a content source server over a network, a request to provide a content item for display with content at a device, the content, provided by the content source server, including at least one display position for displaying the content item;

responsive to receiving the request from the content source server:

determine, at the content selection server, a bandwidth of the channel between a content source and the device, determine, at the content selection server, a quality score for the content item based on a loading speed of a web page, the bandwidth of the channel between the content source and the device, one or more keywords associated with the content item, and a size of the content item, determine, at the content selection server, a bid amount for the content item, based on the quality score and the bid amount, select, at the content selection server, the content item for presentation on the device, the quality score indicating faster loading speed of the web page over loading speeds of web pages associated with other content items, and provide, over the network, the content item for display with the content at the device.

10. The system of claim 9, wherein the loading speed of the web page and the bandwidth of a channel between a content source and the device are determined when the request for content and the content item is received.

11. The system of claim 9, wherein the one or more processors are configured to determine a speed of the device in relation to the bandwidth necessary to present the content item.

12. The system of claim 11, wherein presentation of the content item includes displaying a content provider's web page.

13. A non-transitory computer-readable storage medium having machine instructions stored therein, the instructions being executable by a processor to cause the processor to perform operations to improve a quality of displaying a content item at a device, comprising:

receiving, at a content selection server from a content source server, over a network, a request to provide a content item for display with content at a device, the content, provided by the content source server, including at least one display position for displaying the content item; and responsive to receiving the request from the content source server:

determining, at the content selection server, a bandwidth of a channel between a content source and the device, determining, at the content selection server, a quality score for the content item based on a loading speed of a web page, the bandwidth of the channel between the content source and the device, one or more keywords associated with the content item, and a size of the content item, determining, at the content selection server, a bid amount for the content item, based on the quality score and the bid amount, selecting, at the content selection server, the content item for presentation on the device, the quality score indicating faster loading speed of the web page over loading speeds of web pages associated with other content items, and providing, over the network, the content item for display with content on the device.

14. The non-transitory computer-readable storage medium of claim 13, wherein the loading speed of the web page and the bandwidth of a channel between a content source and the device are determined when the request for content and the content item is received.

15. The non-transitory computer-readable storage medium of claim 13, wherein the operations calculating the quality score further comprise determining a speed of the device in relation to the bandwidth necessary to present the content item.

16. The non-transitory computer-readable storage medium of claim 13, wherein presentation of the content item includes displaying a content provider's web page.

* * * * *